United States Patent [19]
Clement

[11] 4,113,127
[45] Sep. 12, 1978

[54] VEHICLE TOP LOADING MECHANISM

[76] Inventor: Clyde H. Clement, 8439 N. 13th Pl., Phoenix, Ark. 85020

[21] Appl. No.: 828,503

[22] Filed: Aug. 29, 1977

[51] Int. Cl.² ............................................. B60R 9/00
[52] U.S. Cl. ............................. 214/450; 224/42.1 H
[58] Field of Search ................. 214/92, 450, 454, 518, 214/453, 301, 451, 452; 224/42.1 H, 42.1 E

[56] References Cited

U.S. PATENT DOCUMENTS

| | | | |
|---|---|---|---|
| 3,823,839 | 7/1974 | Petzing et al. | 214/450 |
| 3,878,955 | 4/1975 | Udden | 224/42.1 H X |
| 4,039,096 | 8/1977 | McAllister | 224/42.1 H X |

*Primary Examiner*—Frank E. Werner

[57] ABSTRACT

A loader mechanism particularly suited for loading and unloading wheelchairs from a carrier mounted on top of a vehicle has a base frame member mounted on hinges along one edge of the vehicle top. The base frame member is raised and pivoted upwardly on the hinges beyond vertical when it is desired to load objects into or unload objects from the loader mechanism. In this latter position, additional mechanism is used to open a cover of the loader mechanism in a clam shell manner along second hinges attaching the cover to the base frame member along the edge of the base frame member opposite the edge which is hingedly attached to the vehicle top. When the cover is open and the base frame member is in its generally vertical position, an object such as a wheelchair is raised into and lowered from the loader mechanism by a cable which is wound into and unwound from the loader mechanism.

6 Claims, 10 Drawing Figures

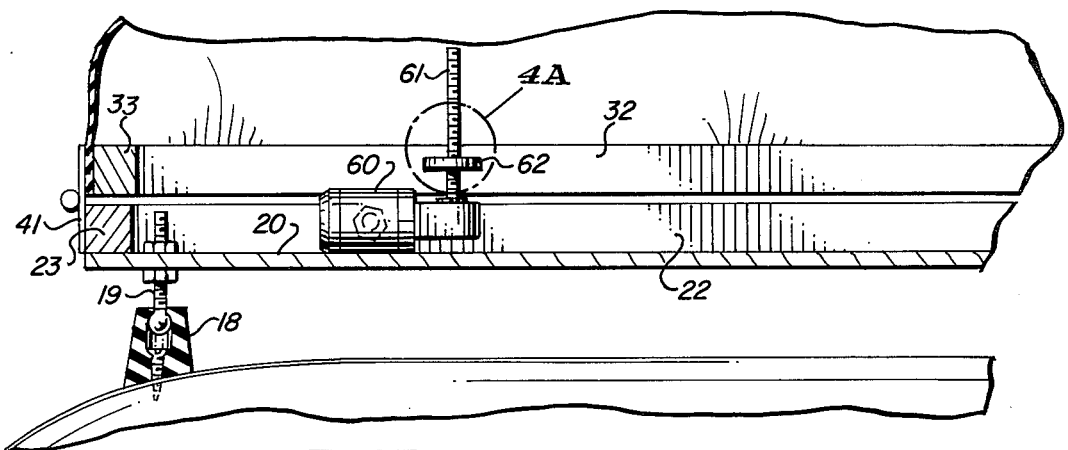
FIG-4
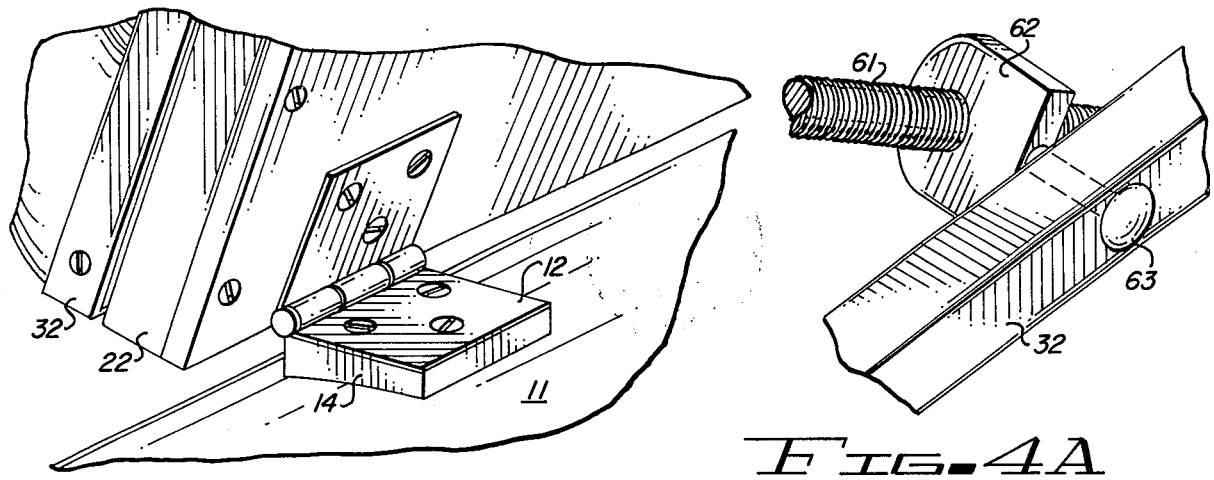
FIG-5
FIG-4A
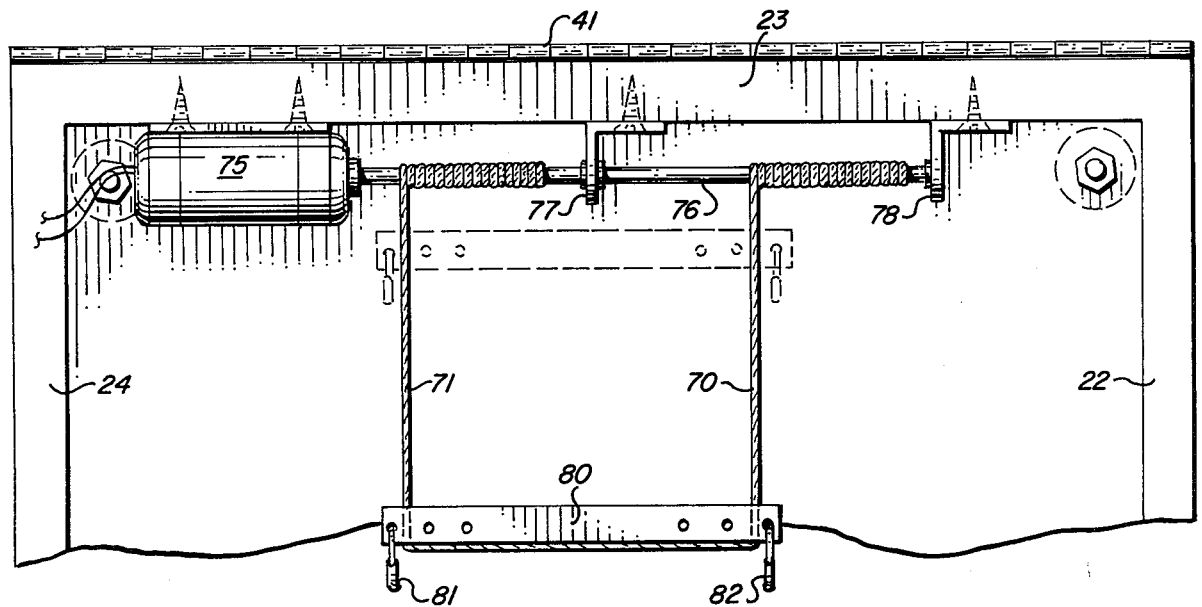
FIG-6

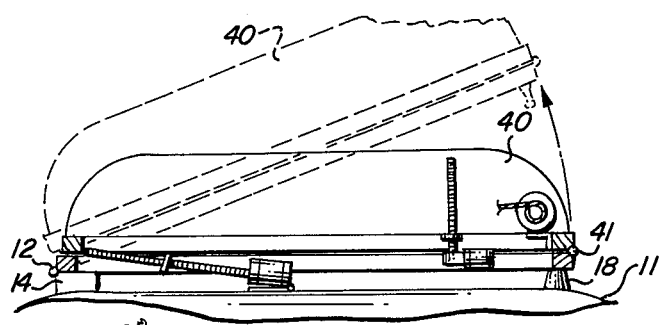
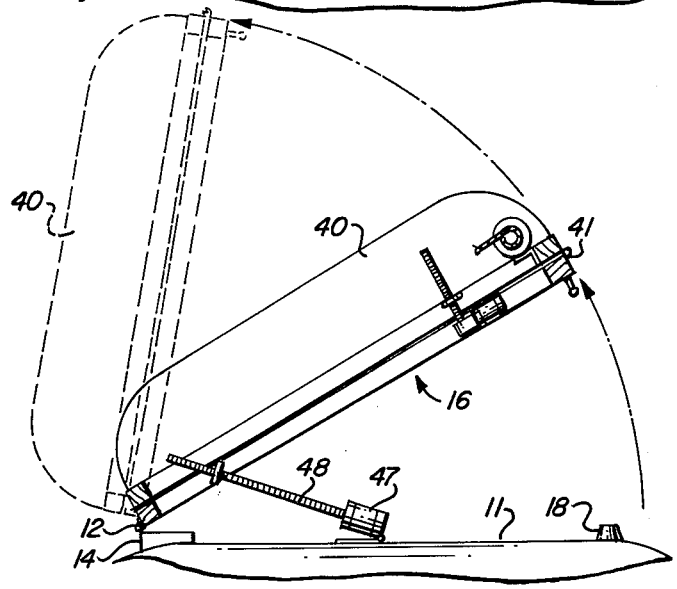
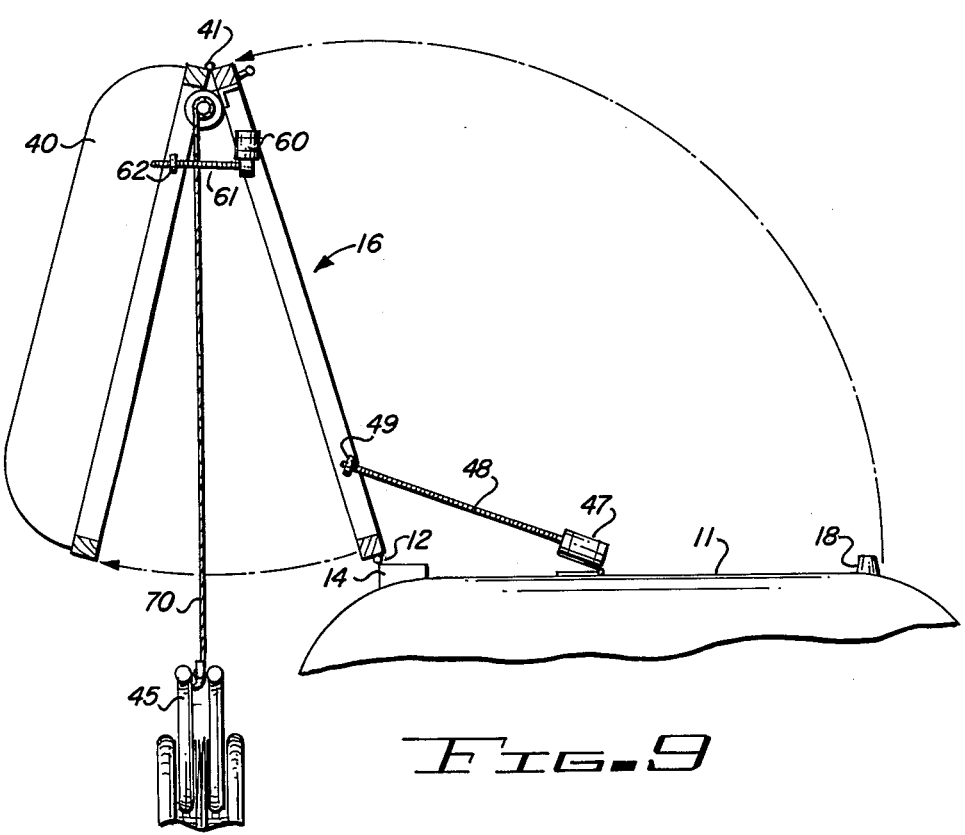

VEHICLE TOP LOADING MECHANISM

BACKGROUND OF THE INVENTION

Today millions of people are confined to wheelchairs throughout the world; and this number inreases daily through automobile accidents, various diseases and old age. Many of these people drive automobiles or could drive automobiles if some suitable provision could be made for loading and unloading the wheelchair from the automobile; so that the person using the wheelchair could slide off the automobile seat onto the wheelchair and vice-versa. At the present time, perons who use wheelchairs and who also are not capable of loading the wheelchairs into the trunk of an automobile, that is, capable of at least some limited use of their legs to walk from the rear of the automobile to the door at the driver's side, are confined to the use of relatively large two-door automobiles. The reason for this is that in large two-door automobiles the door extends past the front seat toward the rear of the automobile and the wheelchair user then can grasp the wheelchair, lean forward in the seat, pull the seat forward, and push or shove the wheelchair into the space between the seats. A similar contortion is necessary in order to take the wheelchair from behind the seat and place it alongside the seat, so that the person may use it.

Obviously a great deal of physical exertion is required to accomplish this maneuver for a person sitting in the front seat of the automobile; so that frail persons or persons who do not have a great deal of strength in their arms cannot avail themselves of this technique.

Even if a person is able to handle a wheelchair in this manner, the wheelchair user is clearly restricted in the type of automobile which he may use. He is precluded from use of any four-door automobile, pick-up trucks and most of the smaller compact economical automobiles. For persons who are unable to use large two-door sedans and store a wheelchair behind the front seat of the sedan, the only other alternative available in the past has been to purchase a specially equipped van having hydraulic lifts and the like for loading and unloading persons in wheelchairs from the van. Once a person is within the van he then can transfer himself from the wheelchair to the driver's seat if he desires. The initial cost of such vans, however, even without the conversion equipment is quite high; and when the hydraulic lifts and other paraphernalia is added to the van, the resultant cost is nearly prohibitive to most people.

Recognizing the problem that wheelchair users have in loading and unloading a wheelchair from a vehicle, some solutions to car-top mounted wheelchair loader mechanisms have been proposed in the past. One such mechanism utilizes a rather complicated mechanical structure with a large carrier frame into which the wheelchair is attached and which is lowered from the loader at the top of the vehicle and lifted back into the loader by means of a chain link mechanism. The large number of moving parts in such a device cause it to be initially expensive and susceptible to breakdowns and relatively costly repairs.

Another type of top loading mechanism for mounting a loader for a wheelchair on the top of the vehicle has been developed by Applicant, and this loader is considerably simpler in construction than the mechanism described in the previous paragraph. This simplified top loader forms the subject matter of applicant's co-pending application Ser. No. 801,025, filed May 27, 1977.

The mechanism of this copending application however, still involves a relatively large number of parts to effect the loading and unloading of wheelchairs into and from a loader mounted on the top of a motor vehicle.

It is desirable to satisfy the need for a wheelchair loader which can be used with all types of cars or trucks, including economical sub-compact automobiles, pick-up trucks, station wagons, and four-door sedans and which is of simple and economical construction.

SUMMARY OF THE INVENTION

Accordingly it is an object of this invention to provide an improved object loading apparatus for motor vehicles.

It is another object of this invention to provide an improved object loading apparatus mounted on the top of the motor vehicle.

It is another object of this invention to provide an improved wheelchair loading apparatus for motor vehicles which has a minimum number of moving parts.

It is a further object of this invention to provide an improved loading apparatus of simple construction which may be used with a wide variety of automobiles and which is mounted on the roof of an automobile or motor vehicle for loading and unloading wheelchairs from a position adjacent the driver's seat.

In accordance with a preferred embodiment of this invention, an improved loader is designed for mounting on the top of a motor vehicle for raising an object such as a wheelchair from alongside the vehicle to its top and for lowering such an object from the top of the vehicle to the ground alongside the vehicle. The loader includes a base frame member which is pivotally mounted along one edge of the top of the vehicle by hinges, and mechanism is provided for moving this base frame member from a horizontal position on the top of the vehile to a position past vertical to extend the edge of the base frame member which is opposite the hinged edge to a position laterally displaced from the side of the vehicle. A cover frame overlies the base frame member and encloses the area in which objects are stored in the loader. The cover frame is hinged to the base frame member along the edge opposite the edge of the base frame member which is hinged to the top of the motor vehicle. When the base frame member is extended upwardly past the vertical position, the cover frame is opened on its hinge much like a clam shell opening to permit wheelchairs or other objects to be unloaded from the loader or loaded into it by raising and lowering them directly through the opening between the two frame members by means of a cable attached to the object. The control of the winding and unwinding of the cable may be effected by the driver from a convenient position in the vehicle, such as by a switch mounted on the dashboard. When the wheelchair or other object is positioned on the ground adjacent the driver's seat, the cable may be disconnected and the wheelchair or object may be used. The procedure is reversed to load the wheelchair or other object into the loader.

BRIEF DESCRIPTION OF THE DRAWINGS

FIG. 4 is a partially cut-away side view of a portion of the embodiment shown in FIG. 1;

FIGS. 4A and 5 illustrate additional details of the embodiment shown in FIGS. 1 and 4;

FIG. 6 is a top view of a portion of the embodiment shown in FIG. 1; and

FIGS. 7, 8 and 9 are diagrammatic representations of the operation of the mechanism shown in FIG. 1.

DETAILED DESCRIPTION OF THE PREFERRED EMBODIMENT

Figure 1:
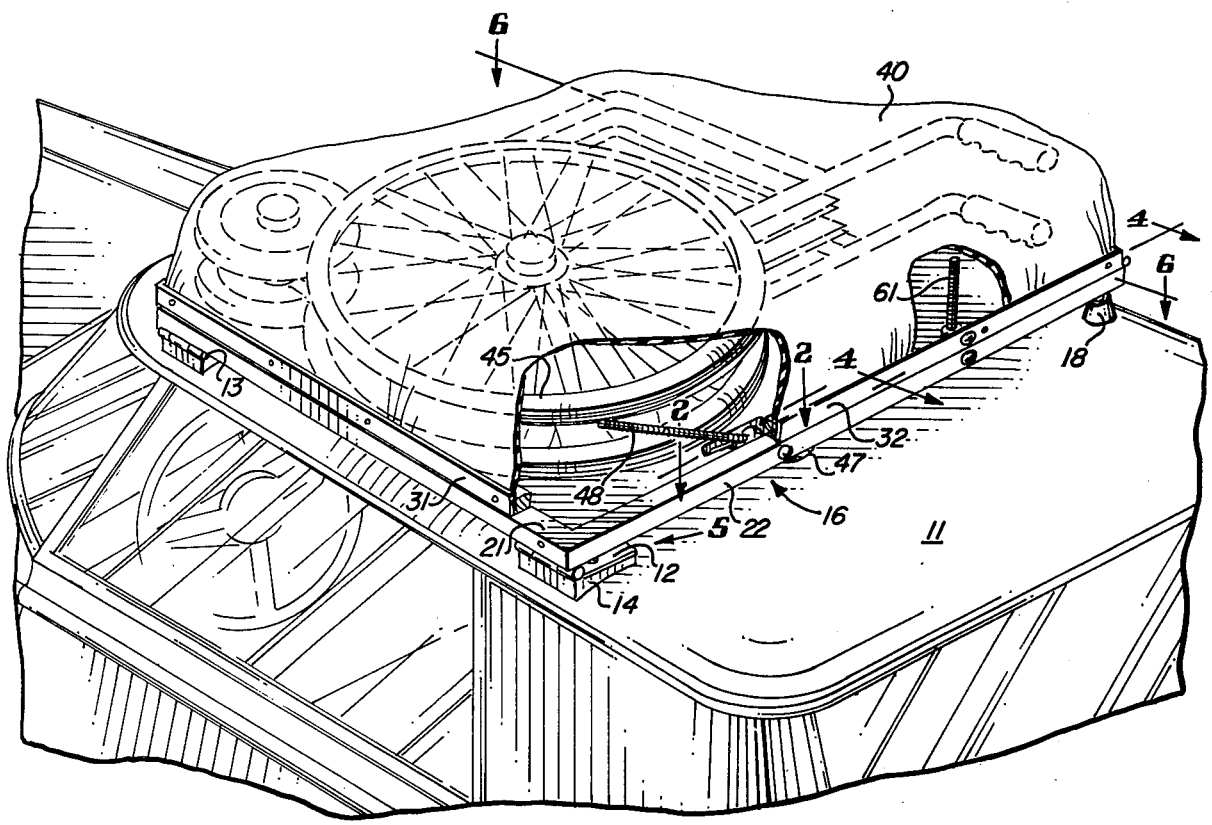
FIG. 1 is a partially cut-away perspective view of a preferred embodiment of the invention mounted on the top of an automobile.

Reference now should be made to the drawings in which the same reference numbers are used throughout the several Figures to designate the same components. FIG. 1 is a partially cut-away view of a preferred embodiment of a wheelchair loader attached to the roof 11 of an automobile by means of a pair of hinges 12 and 13 which are attached to the automobile roof along the edge adjacent the driver's door. The details of one of these hinges, hinge 12, are shown in FIG. 5. A spacer 14 is placed under each of the hinges 12 and 13 and conforms to the slope of the roof of the automobile, so that a base frame 16 of the loader extends genereally horizontally across the roof of the automobile when the loader is in the loaded or carrying position.

The edge of the base frame 16 which is opposite the driver's side of the vehicle rests on a pair of cushion supports 18 which may be formed of rubber or other suitable cushioning material. The supports 18 are attached directly to the vehicle roof as shown most clearly in FIG. 4.

Each of the supports 18 has a hollowed-out center portion for receiving the end of a mating projection 19 which is threadedly fastened to a bottom platform 20 of the base frame 16. The projections 19 may be vertically adjusted upon initial installation of the loader to compensate for variations in the roof contours of different vehicles on which the loader may be mounted. This adjustment is made to cause the bottom 20 of the base frame 16 to be horizontal when the loader is in position for transporting the wheelchair or other load is illustrated in FIGS. 1 and 4.

The bottom 20 of the base frame 16 is attached to four fixed side frame members 21, 22, 23 and 24 to constitute the rectangularly shaped base frame member 16. These side support members may be made of any suitable material which provides sufficient structural rigidity, and the bottom 20 is made of material strong enough to support the weight of the wheelchair or other object which is to be carried by the loader.

A cover frame is constructed of four similar fixed side frame members 31, 32, 33 and 34 which overlie, respectively, the fixed side frame members 21, 22, 23 and 24 of the base frame member. A flexible cover 40, which may be made of any suitable material such as vinyl, canvas or the like is attached to the cover side frame members 31 to 34. Preferably the material of which the cover 40 is made is water repellent and heat and wind resistant, so that it can withstand the elements when the carrier is in place for use on the top of an automobile. Alternatively, the cover 40 could be a rigid over attached to the side frame members 31 through 34 in any suitable manner. The cover frame member is attached to the base frame member by an elongated hinge 41, such as a piano hinge, which interconnects the fixed side frame members 23 and 33 of the base frame 16 and the cover frame, respectively. Thus, the hinge 41 interconnects these two portions of the loader along the edge which is opposite the edge of the base frame 16 which is attached to the roof of the automobile by the hinges 12 and 13.

When the loader is in its closed, carrying position, a wheelchair 45 or other object to be carried in the loader is fully enclosed by the loader, rests on the bottom 20 of the base frame 16, and is covered by the cover 40 of the cover frame. To insure a weather tight seal between the cover frame fixed side members 31 to 34 and the corresponding fixed side frame members 21 to 24 of the base frame, a neoprene gasket or the like may be attached to the upper surfaces of the fixed side frame members 21, 22, 23 and 24, for example; to engage the lower surfaces of the corresponding side frame members 31, 32, 33 and 34.

Figures 2, 3:
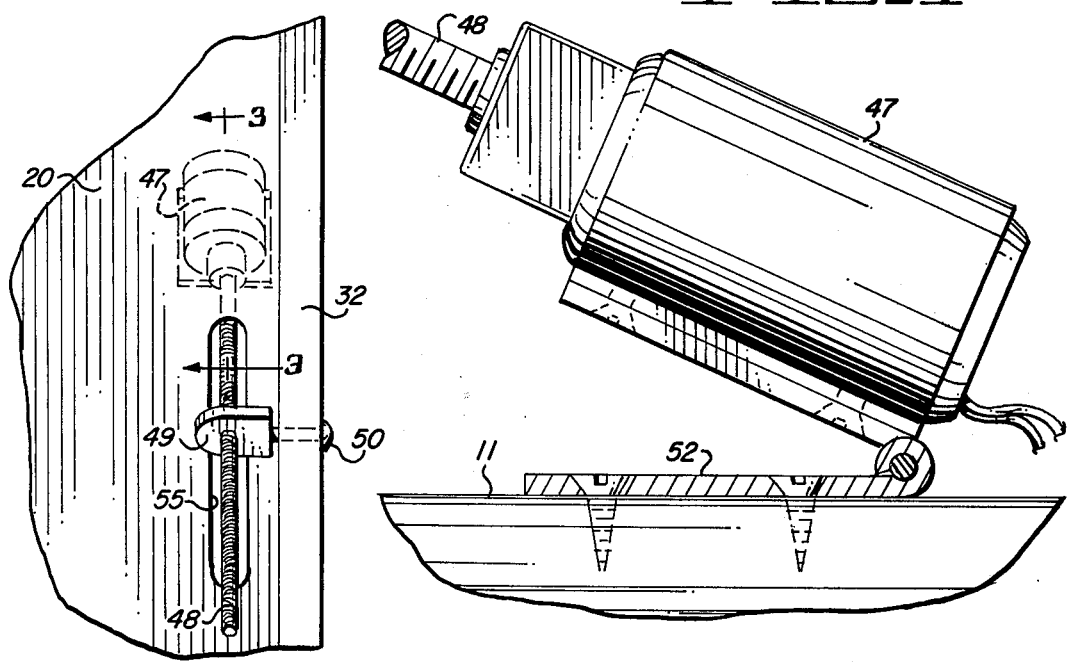
FIGS. 2 and 3 are detailed views of portions of the embodiment illustrated in FIG. 1.

To operate the loader to either unload a wheelchair 45 or other object from it or to load the wheelchair into the loader from alongside the vehicle, an electric motor 47 is operated in a first direction to turn a worm screw 48 which engages a follower 49 pivotally attached to the side frame 32 by means of a pivot pin 50. The motor 47 is attached directly to the roof of the motor vehicle by means of a hinge 52 to permit the motor 47 to adjust its angle relative to the roof 11 of the vehicle as the rotatation of the worm 48 drives the follower 49 outwardly and upwardly away from the motor 47. As this occurs, the base frame 16 is tilted from the horizontal position shown in FIG. 1 in a counter-clockwise direction as viewed in FIG. 1 by pivoting it on the pins of the hinges 12 and 13 as illustrated in FIG. 5. The pivotal attachment of the follower 49 and the hinged attachment of the motor 47 permit this tilting of the base frame to be effected by compensating for the change in angle between the motor, the worm 48 and the follower 49. The worm 48 of the motor extends through a slot 55 in the bottom 20 of the base frame as illustrated most clearly in FIG. 2. Reversal of the direction of operation of the motor 47 to reverse the rotation of the worm 48 returns the base frame 16 from its extended or tilted position back to the horizontal position after an unloading or loading operation has been effected.

Reference should be made to FIGS. 7 and 8 which show the relative positioning of the loader under control of the motor 47. The solid line position in FIG. 7 illustrates the loaded position of the loader which it occupies when the vehicle is being driven. The dotted line representation in FIG. 7 shows the loader raised partially to effect an unloading or loading operation. This position also has been shown in solid lines in FIG. 8 which has a dotted line configuration showing a further extension of the loader. FIG. 9 illustrates the full extension of the base frame 16 of the loader to the position it occupies for unloading objects from or loading objects into it. It should be noted in FIG. 9 that the edge of the loader on which the hinge 41 is attached then is offset laterally from the side of the vehicle to permit loading and unloading of the wheelchair 45 clear of the vehicle, so that the wheelchair does not bump into the side of the vehicle.

A second motor 60 for driving a worm 61 through a worm follower 62, which is pivotally attached to the fixed side frame member 32 of the cover frame by a pivot pin 63, is used to control the opening and closing of the cover frame with respect to the base frame 16. The operation of the motor 60 is similar to the operation of the motor 47 which has been described previously, and FIG. 4 illustrates the relative positions occupied by the motor 60, the cover frame, and the base frame member when the cover frame is in the closed position to cause the side frame members 31, 32, 33 and 34 of the cover frame to overlie and tightly engage the upper surfaces of the corresponding fixed side frame members 21, 22, 23 and 24 of the base frame 16. Because of space limitations, the motor 60 is mounted onto the bottom 20 of the base frame and operates through a gear box to drive the worm 61 extending at right angles to the shaft of the motor 60.

When the motor 47 has driven the loader to the position shown in FIG. 9, the motor 60 is energized to rotate the worm 61 in a direction to drive the follower 62 away from it (upwardly as viewed in FIG. 4, or toward the left as viewed in FIG. 9) to open the cover frame relative to the base frame 16 in the manner of the opening of a clam shell as illustrated in FIG. 9. FIG. 9 also shows the full open position of the cover 40 relative to the base frame 16 whereupon the wheelchair 45 or other object may be lowered from or pulled up into the loader by means of a pair of cables 70 and 71, shown most clearly in FIGS. 6 and 9.

As shown in FIG. 6, a third motor 75 is used to rotate a shaft 76 which is supported by a pair of bearing support brackets 77 and 78 at its mid-point and at its end remote from the motor 75. The motor 75 in turn is attached to the rear fixed side frame member 23 of the base frame 16 in any suitable fashion. Rotation of the shaft 76 in one direction winds up the cables 70 and 71 onto the shaft 76, and rotation of the shaft in the opposite direction unwinds the cables 70 and 71. The cables 70 and 71 are attached at their opposite ends to a guide bar 80 which carries a pair of suitable fastening devices, such as hooks 81 and 82, which may be removably attached to the wheelchair 45.

As the motor 75 rotates to unwind the cables 70 and 71 the wheelchair 45 is lowered by the cables as illustrated in FIG. 9 past the side of the vehicle to the ground alongside the driver's door. Once the wheelchair 45 reaches the ground, the hooks 81 and 82 may be removed and the bar 80 is returned back into the loader until it is needed again.

The return of the bar 80 into the loader is accomplished by reversing the direction of rotation of the shaft 76 by the motor 75 until the bar is raised up into the confines of the space defined between the cover and the base frame 16. After this has been accomplished, the direction of operation of the motor 60 is reversed to close the cover; and the direction of operation of the motor 47 is reversed to once again pull the base frame 16 back into the horizontal position illustrated in solid lines in FIG. 7 and shown in FIGS. 1 and 4.

Subsequently, when loading of a wheelchair back up into the loader is desired, the foregoing process is repeated to lower the bar 80 to the wheelchair which is now located alongside the vehicle. The hooks 81 and 82 are then connected to the wheelchair and the loading steps then are followed to first wind up the cables 70 and 71 to pull the wheelchair 45 up into the space which is defined between the cover 40 and the base frame 16. The cover 40 then is closed, and the base frame 16 is pulled back from the position shown in FIG. 9 to its horizontal position on the top of the vehicle.

The sequential operation of the motors 47, 60 and 75 may be effected by means of a single control located in a convenient position on or near the dashboard of the motor vehicle. The operating sequence may be transferred from one motor to the other by means of limit switches which are operated first when the position of the base frame 16 shown in FIG. 9 is reached to turn on the motor 60 which in turn is turned off and energizes the motor 75 when the cover 40 is open to the position shown in FIG. 9. Similarly, limit switches can effect the reverse sequential operation of these three motors for the loading which is a reverse of the operating sequence utilized in unloading a wheelchair from the loader.

The foregoing description has been limited to a preferred embodiment of the invention which, however, is considered to be merely illustrative of the principles of the invention and not limiting of the true scope of the invention. Various modifications and equivalent applications of the concepts of this invention will occur to those skilled in the art without departing from the true scope of the invention as set forth in the following claims.

I claim:

1. A loader adapted to be mounted on the top of a motor vehicle for raising objects from the ground alongside the vehicle to its top and for lowering objects from the top of the vehicle to the ground, the loader including in combination:

a base frame member having at least first and second opposite edges, the first edge of which is located near the edge of a vehicle top when the loader is mounted on the top of a motor vehicle;

first hinge means attached to said base frame member near the first edge thereof for mounting said base frame member to the vehicle top;

second hinge means;

a cover frame member overlying said base frame member and attached to the second edge of said base frame member by said second hinge means;

means for positioning said base frame member from a first substantially horizontal position on the vehicle top to a second substantially vertical position extending upwardly from the first edge thereof at said first hinge means;

means for pivoting said cover frame member on said second hinge means from a closed position overlying said base frame member to an open position when said base frame member is in the second position thereof; and means for loading objects into and unloading objects from the loader when said cover frame member is open and said base frame member is in said second position.

2. The combination according to claim 1 wherein said means for positioning said base frame member and said means for pivoting said cover frame member include electric motor means for effecting said positioning and said pivoting.

3. The combination according to claim 1 wherein said means for positioning said base frame member comprises a motor attached to the roof of the motor vehicle for rotating a worm screw engaging a follower attached to said base frame member to pivot said base frame member about said first hinge means from said substantially horizontal position past the vertical position of said base frame member to a point where the second edge of said base frame member extends laterally past the side of a motor vehicle when the base frame member is mounted on the top thereof to permit objects loaded into and unloaded from said loader to clear the side of the motor vehicle.

4. The combination according to claim 1 wherein said base frame member comprises a substantially flat platform and said cover frame member has a cover portion thereon; so that when said lower frame member is closed against said base frame member, objects stored in said loader in the space defined between said base frame member and said cover frame member are protected from the elements.

5. The combination according to claim 1 wherein said means for loading objects into and unloading objects from said loader comprises a cable and mechanism for winding up and extending said cable from a position located within the space between said base frame member and said cover frame member near the second edge of said base frame member.

6. The combination according to claim 5 wherein said means for positioning said base frame member, said means for pivotong said cover frame member, and said means for loading objects all include electric motors for operating mechanisms which effect said positioning, pivoting and loading, respectively.

* * * * *